US012798338B2

(12) United States Patent
Snider et al.

(10) Patent No.: US 12,798,338 B2
(45) Date of Patent: Nov. 17, 2026

(54) VEHICULAR WINDOW ASSEMBLY WITH FLEXIBLE PERIMETER FRAME

(71) Applicant: Magna Exteriors, Inc., Troy, MI (US)

(72) Inventors: Darin J. Snider, Holland, MI (US); David L. Guillozet, Hamilton, MI (US); Kevin A. Welling, Holland, MI (US); Michael J. Hulst, Holland, MI (US)

(73) Assignee: Magna Exteriors, Inc., Troy, MI (US)

( * ) Notice: Subject to any disclaimer, the term of this patent is extended or adjusted under 35 U.S.C. 154(b) by 374 days.

(21) Appl. No.: 18/433,635

(22) Filed: Feb. 6, 2024

(65) Prior Publication Data

US 2024/0270056 A1 Aug. 15, 2024

Related U.S. Application Data

(60) Provisional application No. 63/483,998, filed on Feb. 9, 2023.

(51) Int. Cl.
*B60J 1/00* (2006.01)
*B60J 1/10* (2006.01)
*B60J 1/18* (2006.01)

(52) U.S. Cl.
CPC ............... *B60J 1/007* (2013.01); *B60J 1/006* (2013.01); *B60J 1/10* (2013.01); *B60J 1/18* (2013.01)

(58) Field of Classification Search
CPC ..... B60J 1/007; B60J 1/006; B60J 1/10; B60J 1/18; B60J 10/20; B60J 10/45; B60J 10/70
USPC ................................................ 296/146.15, 93
See application file for complete search history.

(56) References Cited

U.S. PATENT DOCUMENTS 4,139,234 A * 2/1979 Morgan ..................... B60J 1/10 160/371
5,551,197 A 9/1996 Repp et al.
5,826,933 A * 10/1998 Gold ........................ B60J 10/70 296/93
5,853,895 A 12/1998 Lewno
6,691,464 B2 2/2004 Nestell et al.
6,832,457 B2 12/2004 Geiger
6,869,128 B2 3/2005 Farrar et al.
6,920,719 B2 7/2005 Bourque et al.
7,003,916 B2 2/2006 Nestell et al.
7,059,656 B2 6/2006 Mikkaichi et al.
7,073,293 B2 7/2006 Galer
7,125,067 B2 10/2006 Bonnett et al.
7,153,380 B2 12/2006 Ash et al.

(Continued)

*Primary Examiner* — Amy R Weisberg
*Assistant Examiner* — Denise L. Esquivel
(74) *Attorney, Agent, or Firm* — HONIGMAN LLP

(57) ABSTRACT

A vehicular window assembly includes a window panel and a perimeter frame having an attaching portion and a frame portion disposed at a first side of the attaching portion. A tab is disposed at a flexible portion of the frame portion. When the tab is moved to an opened state via flexing of the flexible portion, the tab allows for positioning of the window panel at the perimeter frame, allowing for adhesive bonding of the attaching portion at the inner side of the window panel to attach the perimeter frame to the window panel. With the window panel positioned at the perimeter frame, the perimeter edge of the window panel is received in the frame portion and the flexible portion flexes to move the tab to a closed state, where the tab overlaps a perimeter region of the outer side of the window panel.

25 Claims, 8 Drawing Sheets

(56) References Cited

U.S. PATENT DOCUMENTS

| | | | |
|---|---|---|---|
| 7,188,659 | B2 | 3/2007 | Hansen et al. |
| 7,188,885 | B2 | 3/2007 | Schlater et al. |
| 7,354,093 | B2 | 4/2008 | Wato et al. |
| 7,383,662 | B2 | 6/2008 | Tamaoki |
| 7,560,157 | B2 | 7/2009 | Kasahara et al. |
| 7,588,819 | B2 | 9/2009 | Saimi |
| 7,628,947 | B2 | 12/2009 | Caldoro et al. |
| 7,637,554 | B2 | 12/2009 | Kurokawa et al. |
| 7,641,265 | B2 | 1/2010 | Seiple et al. |
| 7,730,668 | B2 | 6/2010 | Dankert et al. |
| 7,735,897 | B2 | 6/2010 | Seiple et al. |
| 7,874,104 | B2 | 1/2011 | Kimoto et al. |
| 7,950,716 | B2 | 5/2011 | Schlater et al. |
| 7,963,070 | B2 | 6/2011 | Recker |
| 8,015,762 | B2 | 9/2011 | Krahn |
| 8,028,489 | B1 | 10/2011 | Lawrence |
| 8,033,057 | B2 | 10/2011 | Krause et al. |
| 8,033,597 | B2 | 10/2011 | Griffis et al. |
| 8,042,303 | B2 | 10/2011 | Gandhi |
| 8,146,645 | B2 | 4/2012 | Pulcini et al. |
| 8,175,769 | B2 | 5/2012 | Perrin et al. |
| 8,192,671 | B2 | 6/2012 | Coldre et al. |
| 8,215,370 | B2 | 7/2012 | Erdahl |
| 8,272,168 | B2 | 9/2012 | Lahnala |
| 8,312,681 | B2 | 11/2012 | Mouton |
| 8,322,075 | B2 | 12/2012 | Lahnala |
| 8,402,695 | B2 | 3/2013 | Smith et al. |
| 8,495,841 | B2 | 7/2013 | DeGroff |
| 8,561,353 | B2 | 10/2013 | Terai et al. |
| 8,613,171 | B2 | 12/2013 | Dudash |
| 8,631,607 | B2 | 1/2014 | Broadhead et al. |
| 8,667,739 | B2 | 3/2014 | Brookman |
| 8,695,292 | B2 | 4/2014 | Recker |
| 8,776,435 | B2 | 7/2014 | Hulst |
| 8,782,956 | B2 | 7/2014 | Giroux |
| 8,790,562 | B2 | 7/2014 | Sitterlet et al. |
| 8,845,841 | B2 | 9/2014 | Okamoto et al. |
| 8,881,458 | B2 | 11/2014 | Snider et al. |
| 8,931,821 | B2 | 1/2015 | Ackerman et al. |
| 8,959,872 | B2 | 2/2015 | Ayres et al. |
| 9,090,152 | B2 | 7/2015 | Yoshimoto |
| 9,114,870 | B2 | 8/2015 | Chaumel et al. |
| 9,126,474 | B2 | 9/2015 | Cicala |
| 9,168,723 | B2 | 10/2015 | Galant |
| 9,216,633 | B2 | 12/2015 | Payne |
| 9,421,848 | B2 | 8/2016 | Trupiano |
| 9,475,370 | B2 | 10/2016 | Snider et al. |
| 9,493,061 | B2 | 11/2016 | Goto et al. |
| 9,528,315 | B2 | 12/2016 | Kim |
| 9,623,731 | B2 | 4/2017 | Ikeda et al. |
| 10,011,158 | B2 | 7/2018 | Tooker et al. |
| 10,011,159 | B1 | 7/2018 | Salter et al. |
| 10,023,026 | B2 | 7/2018 | Snider et al. |
| 10,167,664 | B2 | 1/2019 | Pretzer et al. |
| 10,239,397 | B2 | 3/2019 | Snider et al. |
| 10,266,037 | B2 | 4/2019 | Hulst et al. |
| 10,315,349 | B2 | 6/2019 | Krueger et al. |
| 10,323,448 | B2 | 6/2019 | Koette et al. |
| 10,369,868 | B2 | 8/2019 | Takahashi et al. |
| 10,427,511 | B2 | 10/2019 | Blottiau |
| 10,434,844 | B2 | 10/2019 | Tooker et al. |
| 10,480,243 | B2 | 11/2019 | Rafter et al. |
| 10,556,489 | B2 | 2/2020 | Lewis et al. |
| 10,639,980 | B2 | 5/2020 | Yajima et al. |
| 10,689,896 | B2 | 6/2020 | Iglesias Sedano et al. |
| 10,807,445 | B2 | 10/2020 | Tooker et al. |
| 10,927,582 | B2 | 2/2021 | Veca et al. |
| 11,110,780 | B2 | 9/2021 | Huttel et al. |
| 11,117,455 | B2 | 9/2021 | Roux et al. |
| 11,260,736 | B1 | 3/2022 | Stafievsky et al. |
| 11,279,066 | B2 | 3/2022 | Stricher et al. |
| 2003/0213179 | A1 | 11/2003 | Galer |
| 2004/0020131 | A1 | 2/2004 | Galer et al. |
| 2006/0107600 | A1 | 5/2006 | Nestell et al. |
| 2008/0127563 | A1 | 6/2008 | Tooker |
| 2013/0119696 | A1* | 5/2013 | Baggett .................. B60J 10/365 156/108 |
| 2019/0389293 | A1 | 12/2019 | Scott |
| 2019/0390021 | A1 | 12/2019 | Goto et al. |
| 2020/0139792 | A1 | 5/2020 | Agemi et al. |
| 2020/0307363 | A1 | 10/2020 | Carnoy et al. |
| 2021/0206243 | A1 | 7/2021 | Jeon et al. |
| 2022/0144055 | A1 | 5/2022 | Bergmann et al. |
| 2023/0094469 | A1 | 3/2023 | Snider et al. |

* cited by examiner

VEHICULAR WINDOW ASSEMBLY WITH FLEXIBLE PERIMETER FRAME

CROSS REFERENCE TO RELATED APPLICATION

The present application claims the filing benefits of U.S. provisional application Ser. No. 63/483,998, filed Feb. 9, 2023, which is hereby incorporated herein by reference in its entirety.

FIELD OF THE INVENTION

The present invention relates to window assemblies for vehicles and, more particularly to a side or rear window assembly for a vehicle.

BACKGROUND OF THE INVENTION

It is known to provide a window assembly for an opening of a vehicle, such as a side window assembly for a side opening of a vehicle. Conventional side openings of sports cars or the like may have an encapsulation molded around or along a periphery of the glass window panel.

SUMMARY OF THE INVENTION

A vehicular window assembly comprises a window panel and a perimeter frame bounded to the window panel. The window panel has an inner side and an outer side separated from the inner side by a thickness of the window panel, and the window panel has a perimeter edge that spans between the inner side and the outer side. The perimeter frame includes (i) an attaching portion and (ii) a frame portion disposed at a first side of the attaching portion. Adhesive is disposed at one selected from the group consisting of (i) the attaching portion and (ii) the inner side of the window panel. A tab is disposed at a flexible portion of the frame portion. The tab is movable, via flexing of the flexible portion, between an opened state and a closed state. When the tab is moved to the opened state, the tab allows for positioning of the window panel at the attaching portion and frame portion. With the tab in the opened state, the window panel is positioned at the attaching portion for adhesive bonding of the attaching portion at the inner side of the window panel via the adhesive to attach the perimeter frame to the window panel. With the perimeter edge of the window panel received in the frame portion, the tab is moved to the closed state, where the tab overlaps a perimeter region of the outer side of the window panel.

These and other objects, advantages, purposes and features of the present invention will become apparent upon review of the following specification in conjunction with the drawings.

DESCRIPTION OF THE PREFERRED EMBODIMENTS

Figure 1:
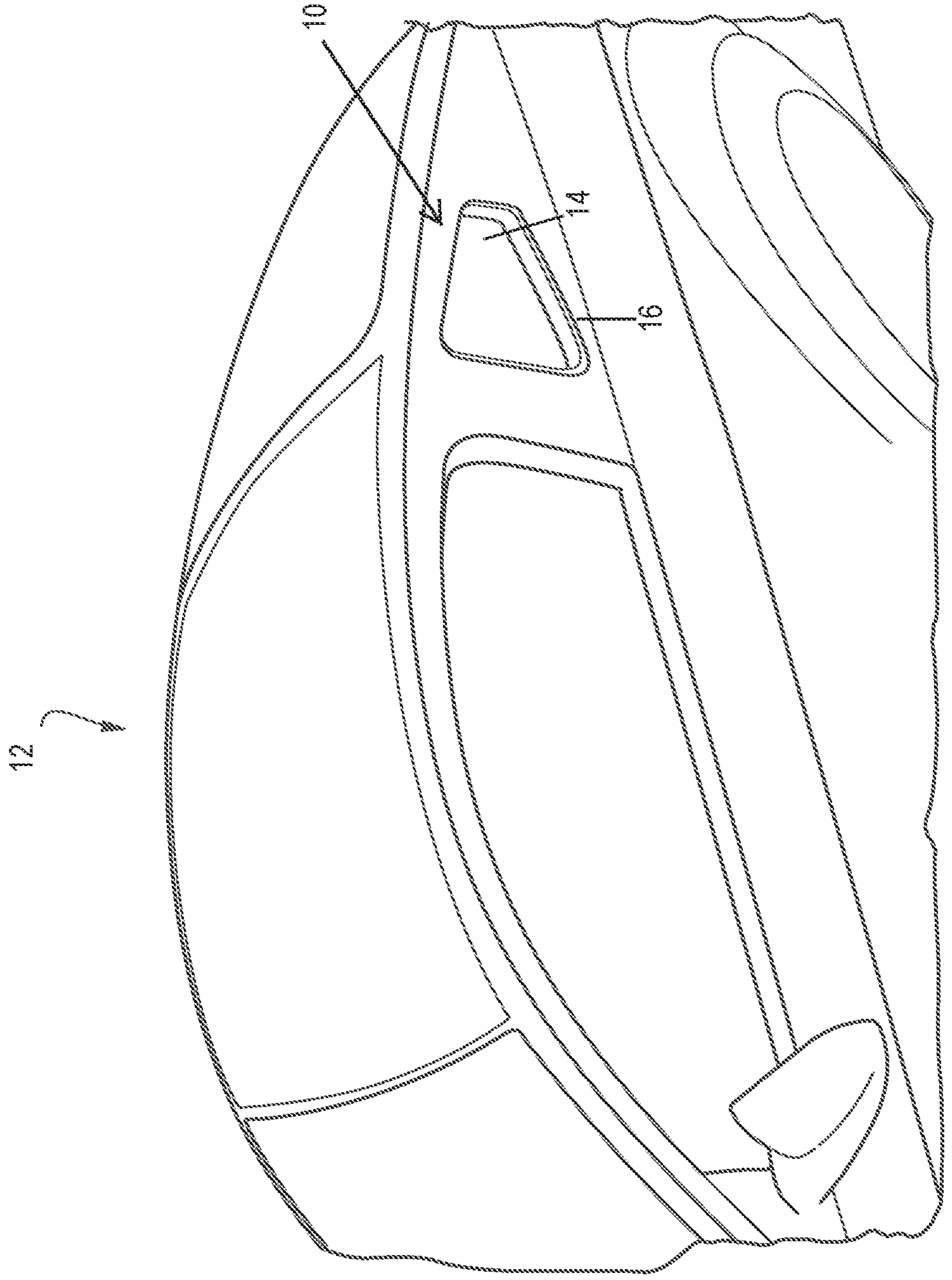
FIG. 1 is a perspective view of a vehicular window assembly at a side rear portion of a vehicle.
Figure 2:
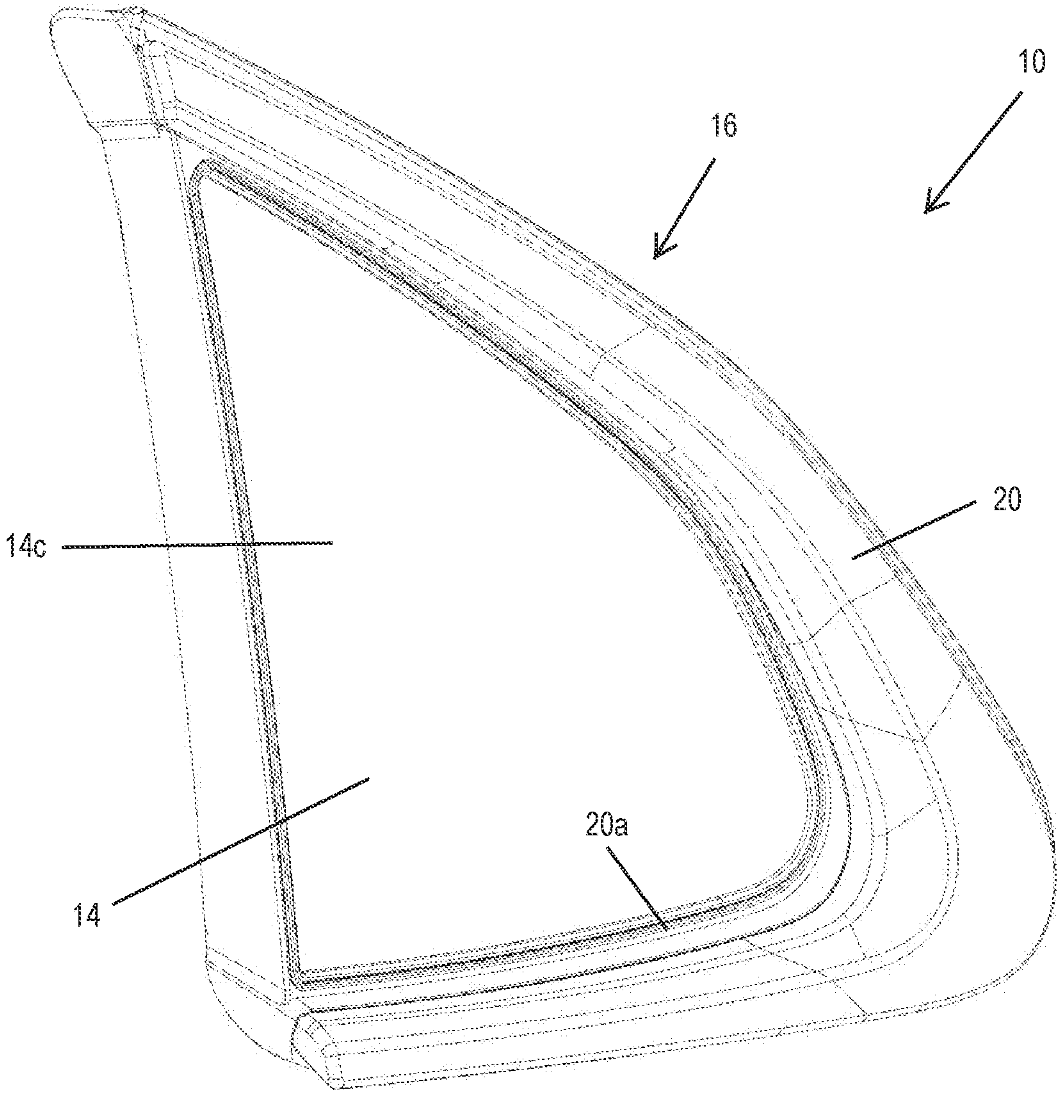
FIG. 2 is a perspective view of the vehicular window assembly of FIG. 1.
Figure 3:
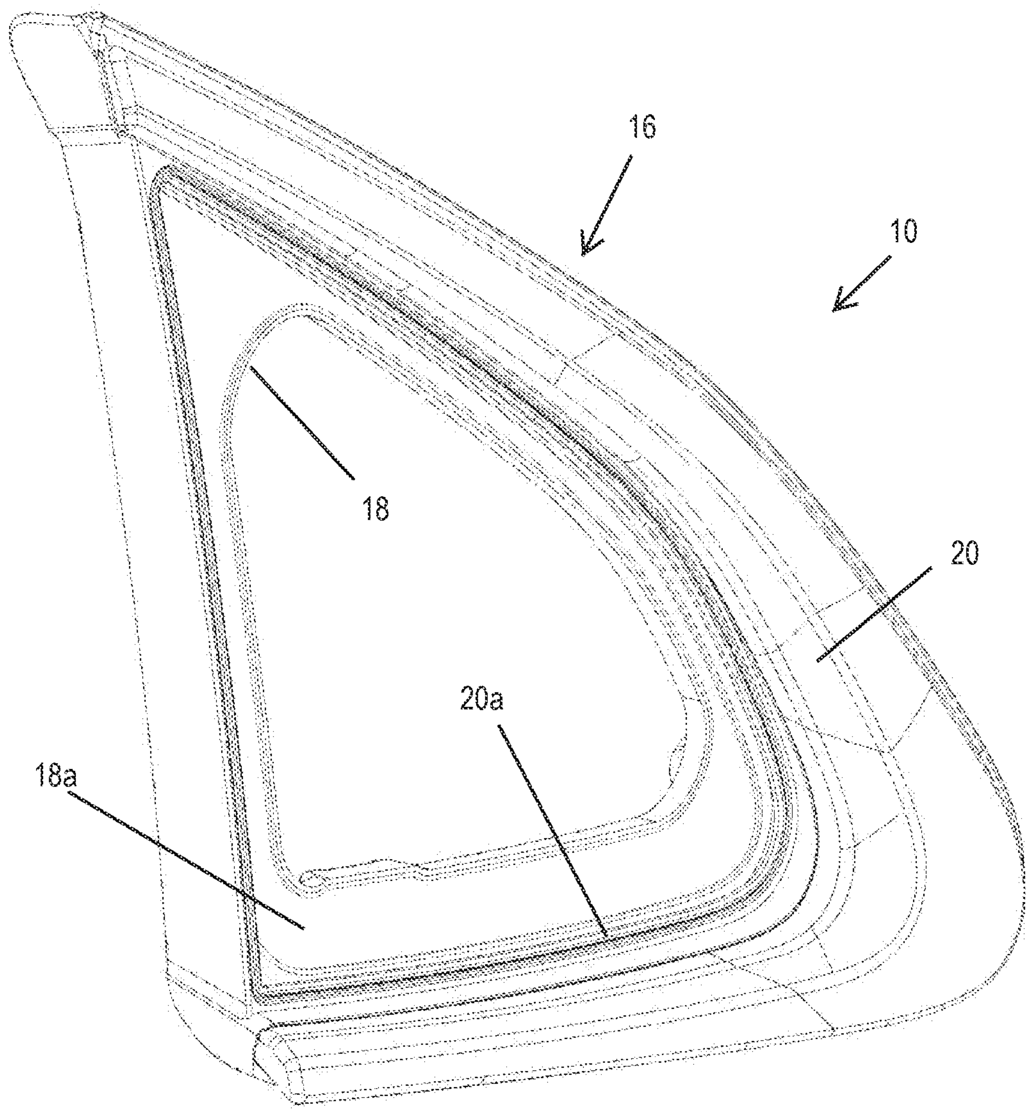
FIG. 3 is another perspective view of the vehicular window assembly, shown without the glass panel.

Referring now to the drawings and the illustrative embodiments depicted therein, a vehicular window assembly 10 (such as a window assembly configured for mounting at a side or rear portion of a vehicle 12) comprises a glass window panel 14 and a perimeter frame 16 that is adhesively bonded along at least one perimeter edge region of the glass window panel (FIGS. 1-5). As shown in FIG. 2-7, the perimeter frame 16 includes a rigid plastic attaching portion or attaching frame portion 18 that is configured to adhesively attach at an inner surface or side **14*a* of the window panel 14 and a softer polymeric outer frame portion 20 that is overmolded along the rigid plastic attaching portion 18 and that is configured to receive a perimeter edge region 14*b* of the window panel 14 when the window panel 14 is attached at the attaching portion 18. The attaching portion 18 is configured to be adhesively bonded at the perimeter region of the inner side 14*a* of the window panel 14, while the outer frame portion 20 engages the perimeter edge 14*b* of the window panel 14 and has a flexible tab 20*a* that flexes to allow for attachment of the perimeter frame to the window panel and that overlaps onto the perimeter region of an outer side or surface 14*c* of the window panel 14, as discussed below. The perimeter frame 16 may include a bezel element 22 (such as a plastic or metallic element) along an outer region of the attaching portion 18 of the perimeter frame 16**.

The attaching portion 18 may comprise any suitably rigid or hard materials, and may be formed or molded out of a plastic or polymeric material (such as an engineered plastic material, such as a polycarbonate or an acrylonitrile butadiene styrene (ABS) or polyethylene terephthalate (PET) material) or the like. The outer frame portion 20 may comprise a softer polymeric material (e.g., a rubber material or other suitable pliable or conformable sealing material), such as, for example, polyvinyl chloride (PVC) or a thermoplastic elastomer (TPE) or the like. The outer frame portion 20 may be molded over and around the attaching portion 18 and may be configured to receive the perimeter edges **14*b* and perimeter regions of the window panel 14 so as to receive or encompass the perimeter edge 14*b* and to seal the perimeter frame 16 at the perimeter edge(s) of the window panel 14. The perimeter frame 16 thus may have the outer frame portion 20 overmolded (or co-extruded or molded via a two-shot molding process) over and along and onto the outer surface of the attaching portion 18**.

Figure 6:
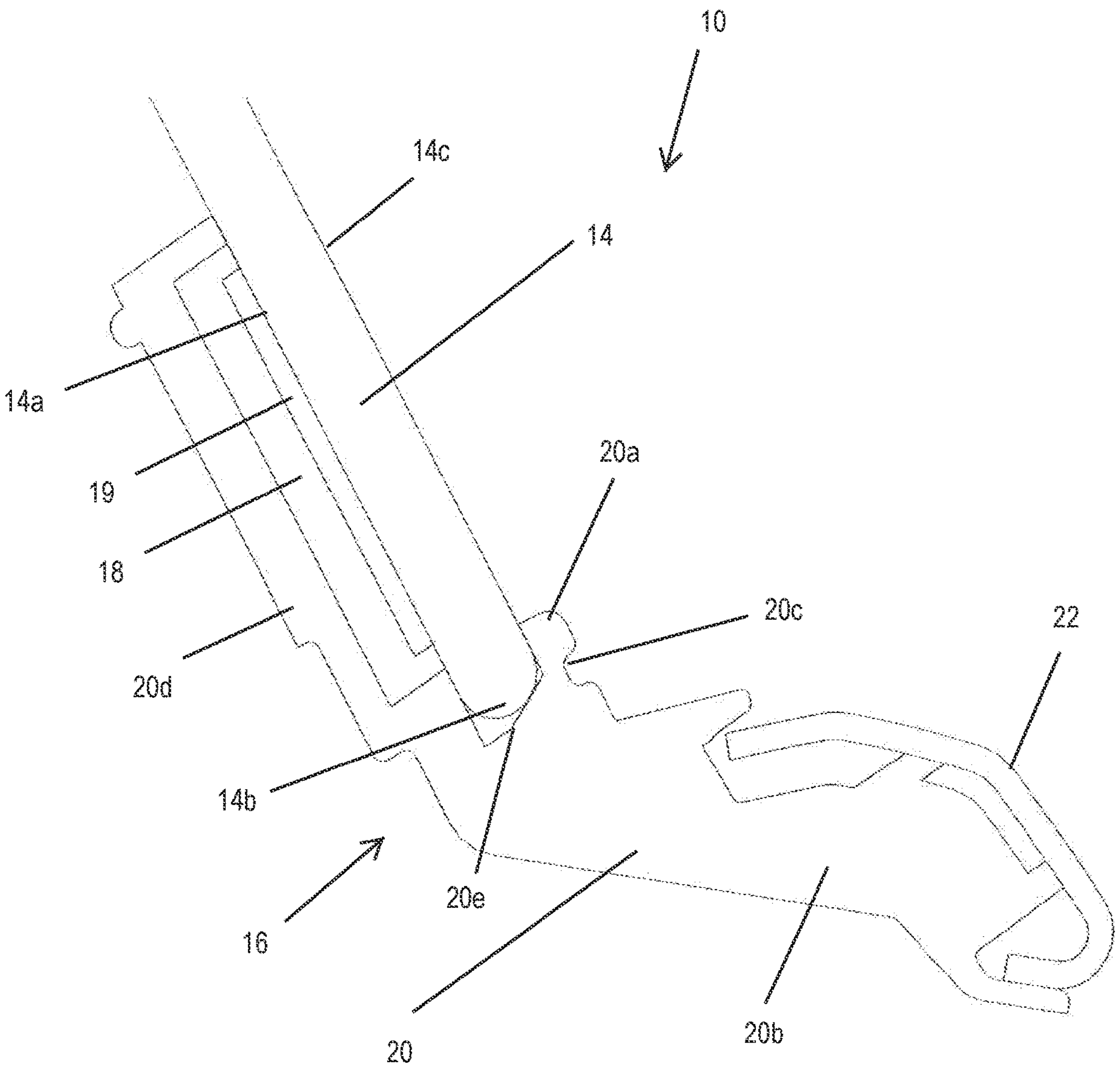
FIG. 6 is a sectional view of the vehicular window assembly of FIG. 1.
Figure 7:
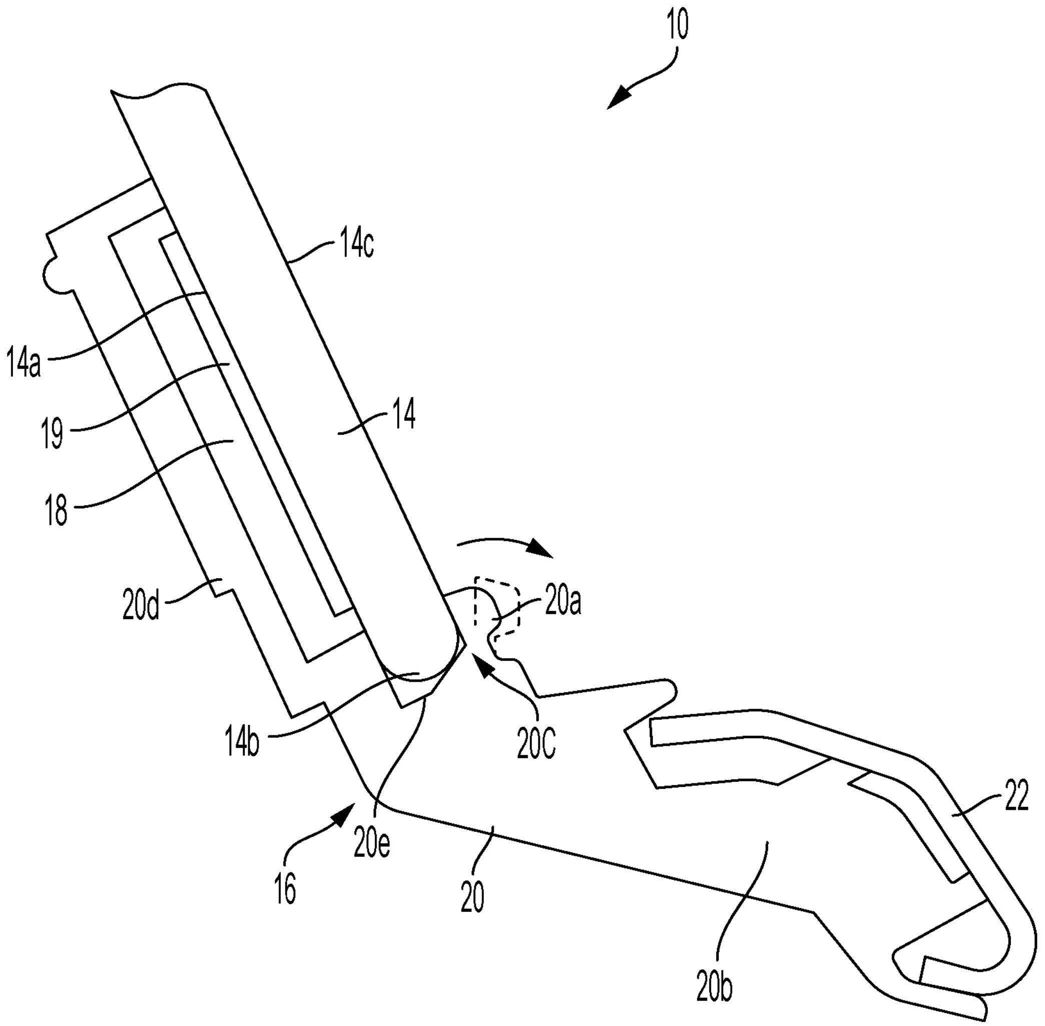
FIG. 7 is another sectional view of the vehicular window assembly, showing flexing of the flexible tab.

As shown in FIGS. 6 and 7, the attaching portion 18 is configured to engage the inner surface **14*a* of the window panel 14. The attaching portion 18 includes a recess 18*a* and legs or ribs that surround the recess and establish the bond-line thickness of an adhesive 19 disposed within and along the recess (or along the inner surface of the window panel) so as to be disposed between the inner surface 14*a* of the window panel and the attaching portion 18 when the attaching portion is positioned at the inner surface of the window panel. Thus, adhesive, such as an adhesive tape or a bead of adhesive, is disposed along the recess 18*a* of the attaching portion 18 and the perimeter frame 16 is attached to the inner surface 14***a* of the window panel 14 when the adhesive and the attaching portion 18 engages the inner surface 14*a* of the window panel along the outer perimeter region of the window panel 14.

Figure 4:
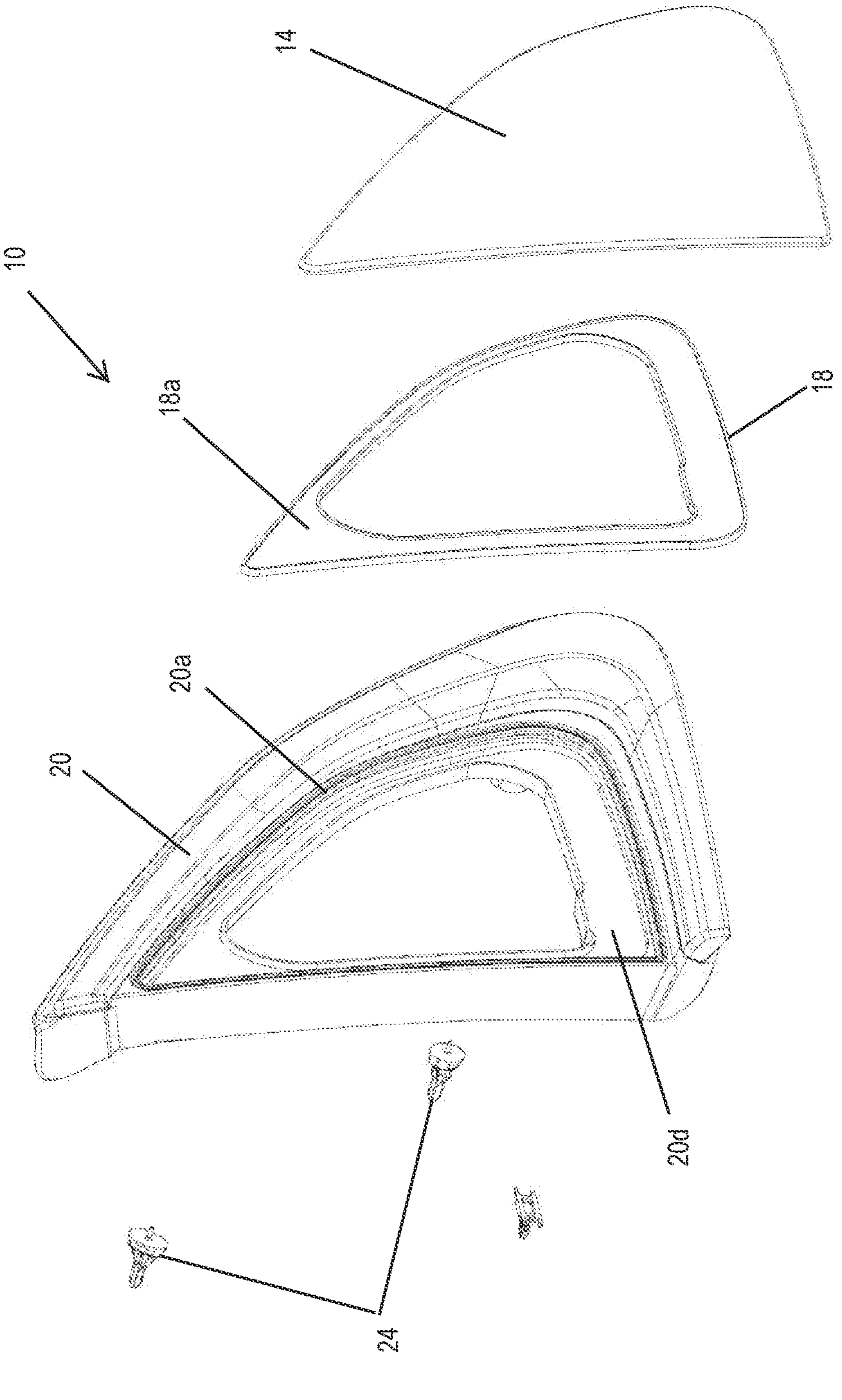
FIG. 4 is an exploded perspective view of the vehicular window assembly of FIG. 1.
Figure 5:
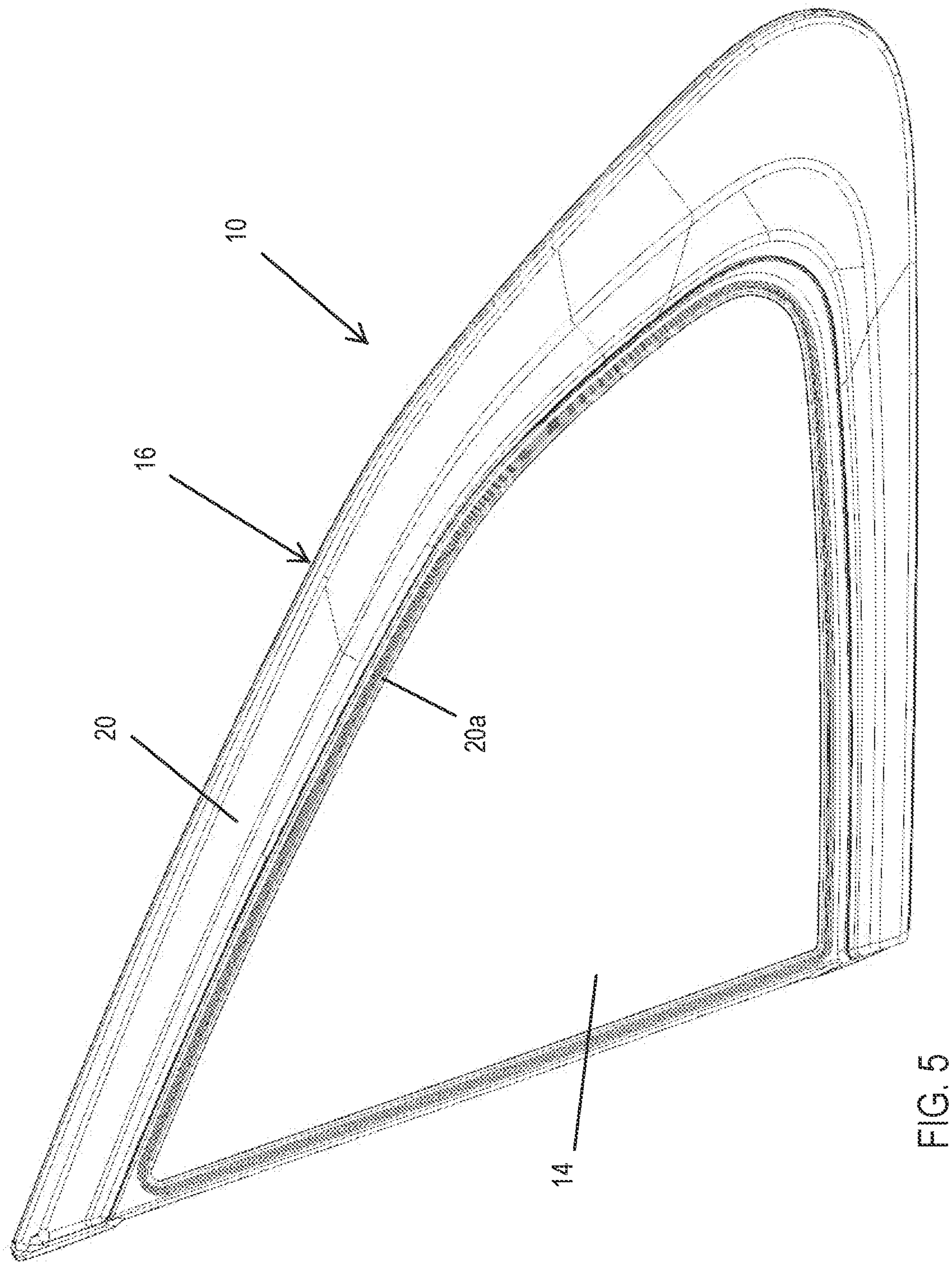
FIG. 5 is side elevation of the vehicular window assembly of FIG. 1.

The outer frame portion 20 is overmolded over the attaching portion 18 and thus has an inner portion 20*d* that conforms to the outer surface profile or contours of the attaching portion 18 (see FIG. 4). The outer frame portion 20, when the attaching portion 18 is attached to the window panel 14, extends along the perimeter region of the inner surface 14*a* of the window panel 14 and extends radially outward from the perimeter region of the window panel 14 (e.g., generally downward in FIG. 6). In the illustrated embodiment, the outer frame portion 20 is formed to generally correspond with the recessed shape of the sheet metal of the vehicle, and is configured to be attached to the vehicle (such as via adhesive or one or more fasteners 24 or the like, such as shown in FIG. 4) when the window assembly is installed at the vehicle. The outer frame portion 20 also includes an outer end portion 20*b* that is configured to have the bezel element 22 attached thereat to provide a desired outer appearance of the perimeter frame.

Thus, the attaching portion 18 attaches to the inner surface 14*a* of the window panel 14 along the perimeter region of the window panel 14 and the outer frame portion 20 extends radially outward from the perimeter region of the window panel 14 to provide an attachment interface between the vehicle and the window assembly. The outer frame portion 20 may be configured to correspond to a shape of the sheet metal or mounting region of the vehicle that receives the window assembly. The outer frame portion 20 may extend around a portion or the entirety of the perimeter edge 14*b* of the window panel 14 and away from an outer surface 14*c* of the window panel 14 so that the window panel 14 is recessed from the outward end portion circumscribing the window panel 14.

As shown in FIGS. 6 and 7, the outer frame portion 20 is molded or established along the inner surface or side of the attaching portion 18 (i.e., the surface or side of the attaching portion 18 facing away from the inner side of the window panel) and has a receiving portion 20*e* that is shaped to receive the perimeter edge 14*b* of the window panel 14. The outer frame portion 20 includes the flexible lip or portion or tab 20*a* that overlaps a small portion of the outer surface 14*c* of the window panel 14 near the perimeter edge 14*b*. As can be seen in FIG. 7, during assembly of the window assembly, the perimeter tab 20*a* may flex or pivot or move outward (via flexing at a hinge or joint or flexible portion 20*c* of the outer frame portion 20) to allow for the window panel 14 to be placed or received in the outer frame portion 20 and against the attaching portion 18 (with the adhesive or adhesive tape disposed thereat). With the window panel 14 received in the receiving portion 20*e* of the outer frame portion 20 and adhered or bonded to the attaching portion 18, the flexible tab 20*a* flexes or pivots or moves (via flexing at the hinge or joint 20*c* of the outer frame portion 20) to its "closed" position, where the flexible tab 20*a* is at and engages and overlaps a perimeter region of the outer surface 14*c* of the window panel 14. With the attaching portion 18 attached at the inner surface 14*a* of the window panel 14, and with the flexible tab 20*a* closed over the perimeter region of the outer surface 14*c* of the window panel, the outer frame portion 20 provides a seal about the perimeter edge 14*b* of the window panel 14.

The bezel element 22 attaches at the outer end portion 20*b* of the outer frame portion 20. The bezel element 22 may extend from the edge of the perimeter frame 16 all the way to the outer surface 14*c* of the window panel 14, such that no portion of the outer frame portion 20 is exposed at the exterior of the vehicle, or the bezel may extend only partially between the edge of the frame and the window panel 14 so that at least a portion of the outer frame portion 20 is exposed (as shown in FIGS. 6 and 7).

As shown in FIGS. 6 and 7, the flexible tab 20*a* flexes or moves via flexing of the joint 20*c* of the outer frame portion 20. The joint 20*c* comprises a narrowing of the material of the outer frame portion 20 at and along the tab 20*a*. In the illustrated embodiment of FIGS. 6 and 7, the narrowed joint 20*c* is at the perimeter edge of the window panel 14. However, the location of the joint 20*c* may be selected to be further from the window panel 14 so as to provide a larger opening when the tab 20*a* is flexed to its opened state or position.

Figure 8:
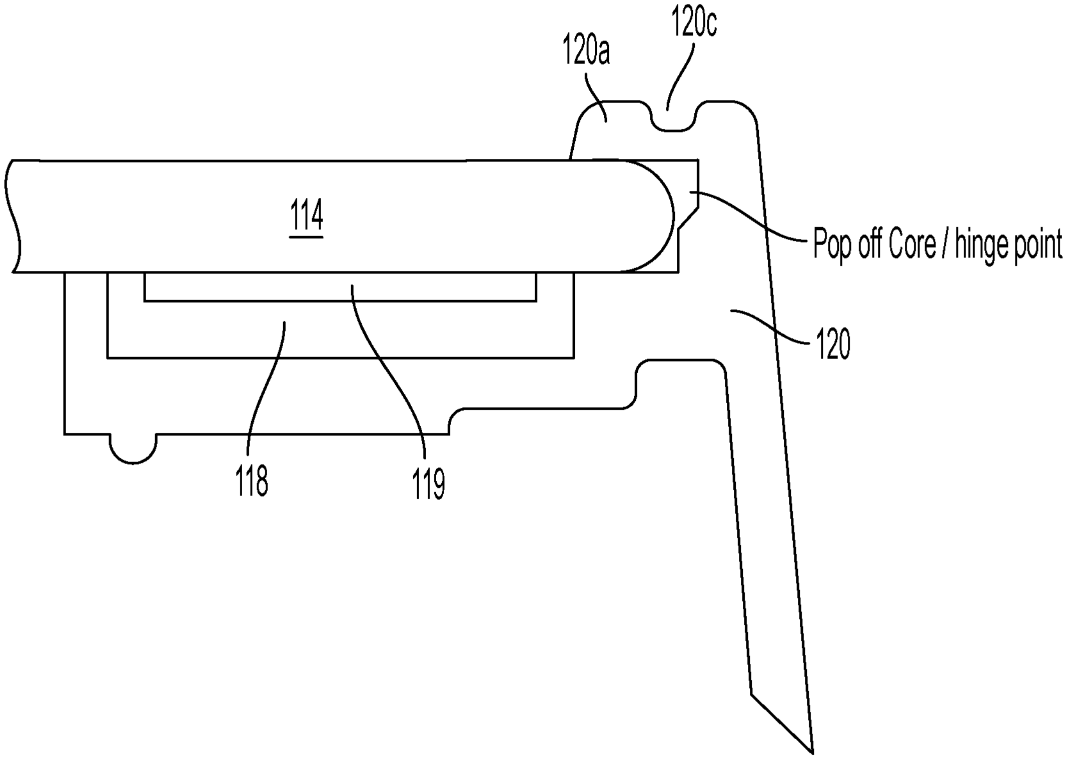
FIGS. 8 and 9 are sectional views of other vehicular window assemblies, showing different flexible tabs and hinges of the perimeter frame.
Figure 9:
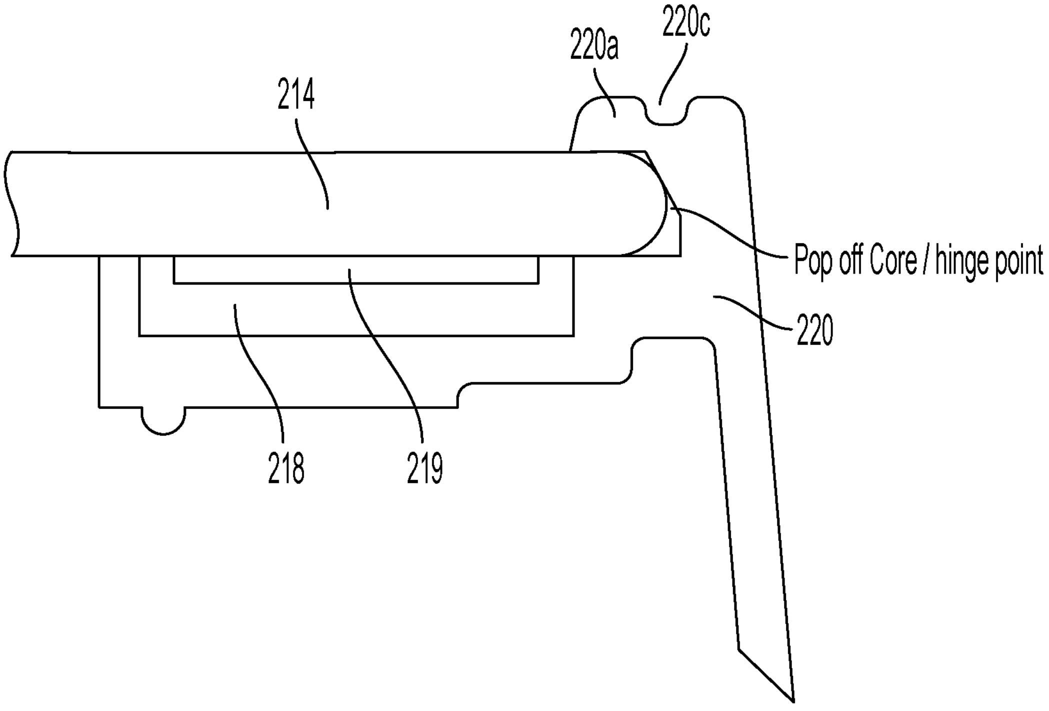

For example, and with reference to FIGS. 8 and 9, a window assembly includes an outer frame portion 120, 220 that has tab 120*a*, 220*a* at a hinge or flexible portion or joint 120*c*, 220*c* that allows for a window panel 114, 214 to be placed or received in the outer frame portion 120, 220 and against an attaching portion 118, 218 and that overlaps onto the perimeter region of an outer side or surface of the window panel 114, 214, such as in a similar manner as discussed above with respect to window assembly 10. As shown in FIG. 8, the hinge 120*c* may be spaced from or radially outward from the perimeter edge of the window panel 114, so that the tab 120*a*, when flexed open, provides more clearance for the window panel 114 to be positioned at the outer frame portion 120 and at the attaching portion 118 for bonding the frame to the window panel 114 (via adhesive 119). The flexible portion or hinged portion or narrowed portion or hinge or joint 120*c* of the outer frame portion 120 (that forms a living hinge type of attachment of the tab 120*a* to the frame portion) may comprise any suitable narrowed or necked portion of the frame at the receiving portion that receives the perimeter edge window panel. Optionally, and such as shown in FIG. 9, the frame portion 220 at the flexible portion or hinge or joint or hinged portion 220*c* may be closer to the window panel 214 (as compared to the frame portion 120 of FIG. 8), depending on the location and shape of the pop-off core/hinge point of the mold/tool that forms the frame portion and overmolds the frame portion over the attaching portion 218 that is adhesively bonded to the window panel via the adhesive 219. Optionally, the narrowed portion may be at an inner side of the tab (facing or opposing the window panel), so that the outer surface of the outer frame portion may provide a uniform surface.

Thus, the perimeter frame 16 may be formed via molding the attaching portion 18 and then overmolding the outer frame portion 20 onto the attaching portion 18. The formed perimeter frame 16 may then be positioned at the window panel 14 (such as along one or more perimeter edges of the window panel or around the periphery of the window panel), and the flexible tab may be moved to its opened state so that the window panel is received at the receiving portion. The outer frame portion 20 receives the perimeter edge 14*b* of the window panel 14 and the attaching portion 18 (with adhesive disposed at the attaching portion or at the inner surface of the window panel) is positioned at and bonded to the inner surface 14*a* of the window panel 14. The outer frame portion 20 seals against the window panel 14 when the attaching portion 18 is bonded to the inner surface 14*a* of the window panel 14 and when the flexible tab 20*a* is flexed to its closed state over the perimeter region of the outer surface 14*c* of the window panel 14. The outer frame portion 20 thus covers the perimeter region of the outer side of the window panel 14 and covers or encloses or encapsulates the perimeter edge of the window panel 14.

The attaching portion 18 is adhesively bonded to the inner surface 14*a* at the perimeter edge region of the window panel 14 (with the outer frame portion 20 overlapping or encompassing the outer surface of the glass panel), such as by utilizing aspects of the window assemblies described in U.S. Pat. Nos. 5,853,895 and/or 5,551,197, which are hereby incorporated herein by reference in their entireties. The bezel element 22 may be attached at the frame before or after the attaching portion 18 is bonded to the inner surface 14*a* of the window panel 14. The window assembly (with frame bonded at the inner surface of the window panel) is then adhered to or fastened to and sealed at the sheet metal of the vehicle. Thus, the perimeter frame is bonded to the window panel and covers the glass edge and perimeter region of the outer side of the window panel, with the flexible tab flexing out of the way to allow the glass window panel to be seated at the attaching portion and adhesive when bonding the frame to the window panel.

Thus, the window assembly provides a bonded perimeter frame that is bonded at the inner side or surface of the window panel. For large window panels (such as large side window panels), the large windows are expensive to encapsulate due to the large tool size needed to fixture the window and mold elements. The bonded perimeter frame allows for the frame to be formed separate from the window panel and then bonded onto the inner side of the glass panel, such that the frame does not encroach onto or overlap the outer surface of the window panel (or only slightly overlaps an edge region of the outer surface of the window panel). The flexible tab allows for enhanced positioning of the window panel 14 within the receiving portion of the perimeter frame during the bonding process that bonds the attaching portion to the inner side of the window panel 14, and may allow for removal of the window panel 14 from the perimeter frame.

The frame may comprise a unitary frame that fully circumscribes (as shown in FIGS. 2-5) or at least partially circumscribes the window panel 14, or the frame may include multiple pieces or portions that are separably attachable at discrete positions about the perimeter of the window panel 14 to form a frame assembly, where each piece or portion includes a respective attaching portion, outer frame portion, and bezel element. For example, a frame assembly may include upper and lower frame pieces for attaching at respective upper and lower edge regions of the window panel and side pieces for attaching at the respective side edge regions of the window panel between the upper and lower edge regions. Thus, the perimeter frame may entirely circumscribe or frame the window panel (i.e., the perimeter frame is disposed along the entirety of the perimeter region of the window panel). Optionally, the perimeter frame may only be disposed along a portion of the perimeter region of the window panel 14, such as only along one or more edges of the perimeter region. For example, the perimeter frame may be attached along the straight edges of the window panel, but not at the rounded corner regions of the window panel, where other sealing means may be used to attach and seal the window panel at the vehicle in the corner regions.

The window panel 14 may comprise a glass window panel, such as transparent tempered glass window panel or the like. Optionally, the window panel 14 may comprise a non-glass material, such as a transparent or substantially transparent plastic or polymeric or acrylic material or the like. Although shown and described as a fixed side window for a vehicle, the window assembly may be suitable for large or small fixed side windows or a rear window (such as a liftgate window such as for a hatchback vehicle or the like) or a top window, such as a sunroof or moonroof or the like.

Optionally, an opaque coating or frit layer may be established at the perimeter regions of the glass panel to substantially conceal or hide the portions of the frame that are disposed at the rear surface of the window panel (e.g., at the inner surface or side of the glass window panel along the perimeter regions where the attaching portion is adhesively bonded). Optionally, the frit or paint or ink layer or coating may be disposed or screened onto a surface of the window panel after forming the glass panel. In applications where an opaque or non-transparent frit layer or other pattern or the like may be disposed at the surface of the window panel, the adhesive may comprise a substantially non-transparent adhesive. The opaque layer or frit layer may comprise a ceramic frit layer and may function to facilitate adhering or bonding of the perimeter frame (and optionally any hardware elements or brackets or hinges or the like) to the window panel. The frit layer may be substantially opaque, and thus may improve the overall appearance of the window assembly, since the bonding surfaces are not readily discernible or viewable through the glass panel and the frit layer. Examples of such frit layers are described in U.S. Pat. Nos. 5,853,895 and/or 5,551,197, incorporated above. The frit layer may be disposed onto the surfaces of the window panel in any desired pattern, such as stripes, dots, wave pattern or the like, to provide the desired appearance to the window panel, depending on the particular application of the window assembly.

The window assembly may utilize aspects of the window assemblies described in U.S. Pat. Nos. 11,260,736; 10,807,445; 10,434,844; 8,881,458; 8,402,695; 7,073,293; 7,003,916 and/or 6,691,464, and/or U.S. Publication Nos. US-2023-0094469; US-2008-0127563; US-2006-0107600; US-2004-0020131 and/or US-2003-0213179, which are all hereby incorporated herein by reference in their entireties.

Changes and modifications to the specifically described embodiments may be carried out without departing from the principles of the present invention, which is intended to be limited only by the scope of the appended claims, as interpreted according to the principles of patent law.

The invention claimed is:

1. A vehicular window assembly, the vehicular window assembly comprising:

a window panel, wherein the window panel has an inner side and an outer side separated from the inner side by a thickness of the window panel, and wherein the window panel has a perimeter edge that spans between the inner side and the outer side;

a perimeter frame comprising (i) an attaching portion and (ii) a frame portion disposed at a first side of the attaching portion;

wherein adhesive is disposed at one selected from the group consisting of (i) the attaching portion and (ii) the inner side of the window panel;

wherein a tab is disposed at a flexible portion of the frame portion, and wherein the flexible portion comprises a joint comprising a narrowing of the frame portion at and along the tab, and wherein the tab is movable, via flexing of the joint, between an opened state and a closed state;

wherein, when the tab is moved to the opened state, the tab allows for positioning of the window panel at the perimeter frame;

wherein, with the tab in the opened state, the window panel is positioned at the perimeter frame and the attaching portion is adhesively bonded at the inner side of the window panel via the adhesive to attach the perimeter frame to the window panel; and wherein, with the window panel positioned at the perimeter frame, the perimeter edge of the window panel is received in the frame portion and the tab is moved to the closed state, where the tab overlaps a perimeter region of the outer side of the window panel.

2. The vehicular window assembly of claim 1, wherein the attaching portion comprises an engineered plastic material.

3. The vehicular window assembly of claim 1, wherein the frame portion comprises a deformable polymeric material.

4. The vehicular window assembly of claim 3, wherein the frame portion at least in part conforms to the perimeter edge of the window panel when the attaching portion is adhesively bonded at the inner side of the window panel.

5. The vehicular window assembly of claim 1, wherein a bezel element is attached at an edge region of the perimeter frame.

6. The vehicular window assembly of claim 1, wherein the frame portion is overmolded along the attaching portion.

7. The vehicular window assembly of claim 1, wherein, when the vehicular window assembly is installed at a vehicle, the perimeter frame is adhesively bonded to an outer surface of the vehicle at a mounting region.

8. The vehicular window assembly of claim 1, wherein, when the perimeter frame is attached to the window panel, the perimeter frame is disposed along a perimeter region of the window panel and at least partially circumscribes the window panel.

9. The vehicular window assembly of claim 8, wherein, when the perimeter frame is attached to the window panel, the perimeter frame fully circumscribes the window panel.

10. The vehicular window assembly of claim 1, wherein the window panel comprises a glass window panel.

11. The vehicular window assembly of claim 1, wherein the vehicular window assembly comprises a vehicular side window configured to mount at a side portion of a vehicle.

12. The vehicular window assembly of claim 1, wherein the flexible portion comprises a living hinge of the frame portion.

13. A method for assembling a vehicular window assembly, the method comprising:

providing a window panel, wherein the window panel has an inner side and an outer side separated from the inner side by a thickness of the window panel, and wherein the window panel has a perimeter edge that spans between the inner side and the outer side;

providing a perimeter frame comprising (i) an attaching portion and (ii) a frame portion having a tab disposed at a flexible portion of the frame portion, wherein the flexible portion comprises a joint comprising a narrowing of the frame portion at and along the tab;

flexing the joint to move the tab to an opened state;

with the tab in the opened state, positioning the window panel at the attaching portion and the frame portion; and with the window panel positioned at the attaching portion, and with the perimeter edge of the window panel received in the frame portion, flexing the joint to move the tab to a closed state, where the tab overlaps a perimeter region of the outer side of the window panel.

14. The method of claim 13, comprising providing adhesive at one selected from the group consisting of (i) the attaching portion and (ii) the inner side of the window panel, and wherein the window panel is positioned at the attaching portion and the frame portion for adhesive bonding of the attaching portion at the inner side of the window panel to attach the perimeter frame to the window panel.

15. The method of claim 13, wherein the attaching portion comprises an engineered plastic material.

16. The method of claim 13, wherein the frame portion comprises a deformable polymeric material.

17. The method of claim 16, wherein the frame portion at least in part conforms to the perimeter edge of the window panel when the window panel is positioned at the attaching portion and the tab is in the closed state.

18. The method of claim 13, wherein a bezel element is attached at an edge region of the perimeter frame.

19. The method of claim 13, wherein providing the perimeter frame comprises overmolding the frame portion along the attaching portion.

20. The method of claim 13, wherein, when the vehicular window assembly is installed at a vehicle, the perimeter frame is adhesively bonded to an outer surface of the vehicle at a mounting region.

21. The method of claim 13, wherein, when the perimeter frame is attached to the window panel, the perimeter frame is disposed along a perimeter region of the window panel and at least partially circumscribes the window panel.

22. The method of claim 21, wherein, when the perimeter frame is attached to the window panel, the perimeter frame fully circumscribes the window panel.

23. The method of claim 13, wherein the window panel comprises a glass window panel.

24. The method of claim 13, wherein the vehicular window assembly comprises a vehicular side window configured to mount at a side portion of a vehicle.

25. The method of claim 13, wherein the flexible portion comprises a living hinge of the frame portion.

* * * * *